United States Patent [19]
Hayashi et al.

[11] 3,944,163
[45] Mar. 16, 1976

[54] SEAT BELT RETRACTOR

[75] Inventors: Yoshihiro Hayashi; Kenji Matsui, both of Aichi, Japan

[73] Assignee: Kabushiki Kaisha Tokai Rika Denki Seisakusho, Aichi, Japan

[22] Filed: Mar. 18, 1974

[21] Appl. No.: 451,737

[30] Foreign Application Priority Data

| Feb. 26, 1974 | Japan | 49-23132[U] |
| Feb. 26, 1974 | Japan | 49-23133[U] |
| Apr. 23, 1973 | Japan | 48-45986 |
| Mar. 24, 1973 | Japan | 48-33702 |

[52] U.S. Cl. .................. 242/107.4 R; 242/107.4 D
[51] Int. Cl.² .................. A62B 35/02; B65H 75/48
[58] Field of Search .......... 242/107.4 R, 107.4 A–E; 280/150 SB; 397/388

[56] References Cited
UNITED STATES PATENTS

| 3,598,336 | 8/1971 | Frost | 242/107.4 |
| 3,667,698 | 6/1972 | Fisher | 242/107.4 |
| 3,746,274 | 7/1973 | Yang | 242/107.4 |
| 3,794,266 | 2/1974 | Schwartz | 242/107.4 |
| 3,834,646 | 9/1974 | Heath | 242/107.4 X |

Primary Examiner—Stanley N. Gilreath
Assistant Examiner—John M. Jillions
Attorney, Agent, or Firm—Spensley, Horn and Lubitz

[57] ABSTRACT

A seat belt retracting apparatus having a spool mounted for rotation on a frame member and adapted to have a seat belt wound thereon, a pair of locking wheels having a plurality of locking teeth and fixedly mounted on the spool, a locking plate engageable with the locking teeth of the locking wheels when the seat belt is protracted and engages the body of a passenger thereby locking the seat belt against further protraction, and a retracting coil spring normally urging the spool in the retracting direction. In the apparatus, lock preventing means are provided for cooperation with the locking wheels through a driving connection between them so that the locking wheels can be temporarily prevented from the locked position and can protract over some pre-selected steps in the state in which the seat belt is engaged on the passenger's body.

5 Claims, 22 Drawing Figures

SEAT BELT RETRACTOR

BACKGROUND OF THE INVENTION

This invention relates to strap retracting apparatus and more particularly to improvements in strap retracting apparatus of the type in which the belt strap is locked against any further protracting movement after it engages the body of a passenger.

A safely seat belt is provided for a seat in a vehicle such as an automobile or airplane, and this seat belt acts to securely hold the body of a passenger to the seat for ensuring his safety when an abrupt shock is imparted to the vehicle. The belt strap for engagement with the body of the passenger is housed within a cover case firmly fixed to a supporting member mounted to the floor of the vehicle or the like and the passenger can wear any desired length of the belt strap on his body by gripping the exposed end of the belt strap and pulling the belt strap out of the cover case.

As an example of prior art seat belt retractors, an automatic locking apparatus is known in which a locking mechanism is actuated as soon as a passenger wears the belt strap on his body so that it acts to prevent any further protraction of the belt strap. In this automatic locking apparatus, the outer diameter of the belt strap turns wound around the spool, slight retraction of the belt strap during manipulation for complete engagement of the belt strap on the wearer's body, or the like are utilized to actuate the locking mechanism, and various kinds of such locking mechanism are already known in the art. This automatic locking apparatus is very satisfactory in ensuring the safety of the passenger due to the fact that it locks completely the belt strap against any further protraction, but it has a defect as described below. Generally, a force for normally urging the belt strap in the retracting direction is imparted to the spool so as to cause automatic retraction of the belt strap into the cover case. This force acts to fasten the body of the passenger to the seat, but it is naturally not so large as to give an uncomfortable sense to the passenger. However, it is generally known that the passenger makes relatively large movement of his body after wearing the seat belt on his body, and following this movement of the passenger's body, the belt strap can only move in the retracting direction by being urged by the retracting force. As a result, the belt strap is locked again in the retracted position when the movement of the passenger's body exceeds a certain amount. Since the belt strap cannot be protracted any further even in this newly established re-locked state, the body of the passenger is tightly fastened in a state which differs from the initially established optimum state.

The belt strap moves a predetermined amount peculiar to the apparatus until it is fixed in the re-locked position, and this predetermined amount corresponds to one step of the locking mechanism which determines the belt length when the belt strap is worn on the body of the passenger. This one step is selected to be less than 25 mm in belt length in view of the demand that the belt length be finely adjusted as much as possible, and it is commonly selected to lie within the range of about 10 to 13 mm. As experience teaches, the movement of the passenger's body exceeds frequently the above-described limit of one step in terms of the belt length. Thus, the belt strap has been re-locked in the one-step retracted position each time the passenger moves his body and the passenger's body has been excessively fastened to such an extent that he feels uncomfortable. In order to alleviate this excessive state of fastening, the entire belt strap had to be released once to be retracted into the cover case and the belt wearing manipulation had to be carried out again. This defect has been an important reason which obstructs wide use of the safety seat belt of the automatic locking type.

SUMMARY OF THE INVENTION

It is a primary object of the present invention to provide an improved seat belt retracting apparatus having an automatic locking mechanism.

Another object of the present invention is to provide a strap retracting apparatus in which a lock preventing means is provided to temporarily prevent the locking engagement between locking wheels and a locking plate so as to increase the allowable range of movement of the body of a passenger.

Still another object of the present invention is to provide a strap retracting apparatus in which the lock preventing means is disposed in coaxial relation with the locking wheels and is engageable at a plurality of locking positions with the locking plate.

Yet another object of the present invention is to provide a strap retracting apparatus in which the lock preventing means is provided with a plurality of auxiliary locking teeth whose one step corresponds to a plurality of steps of the locking wheels, and said lock preventing means operates with the locking wheels through a driving connection including frictional coupling means.

A further object of the present invention is to provide a strap retracting apparatus which includes holding means having restricting means for restricting the movement of the lock preventing means between a preventing position and a non-preventing position.

DETAILED DESCRIPTION OF THE PREFERRED EMBODIMENTS

Figure 1:
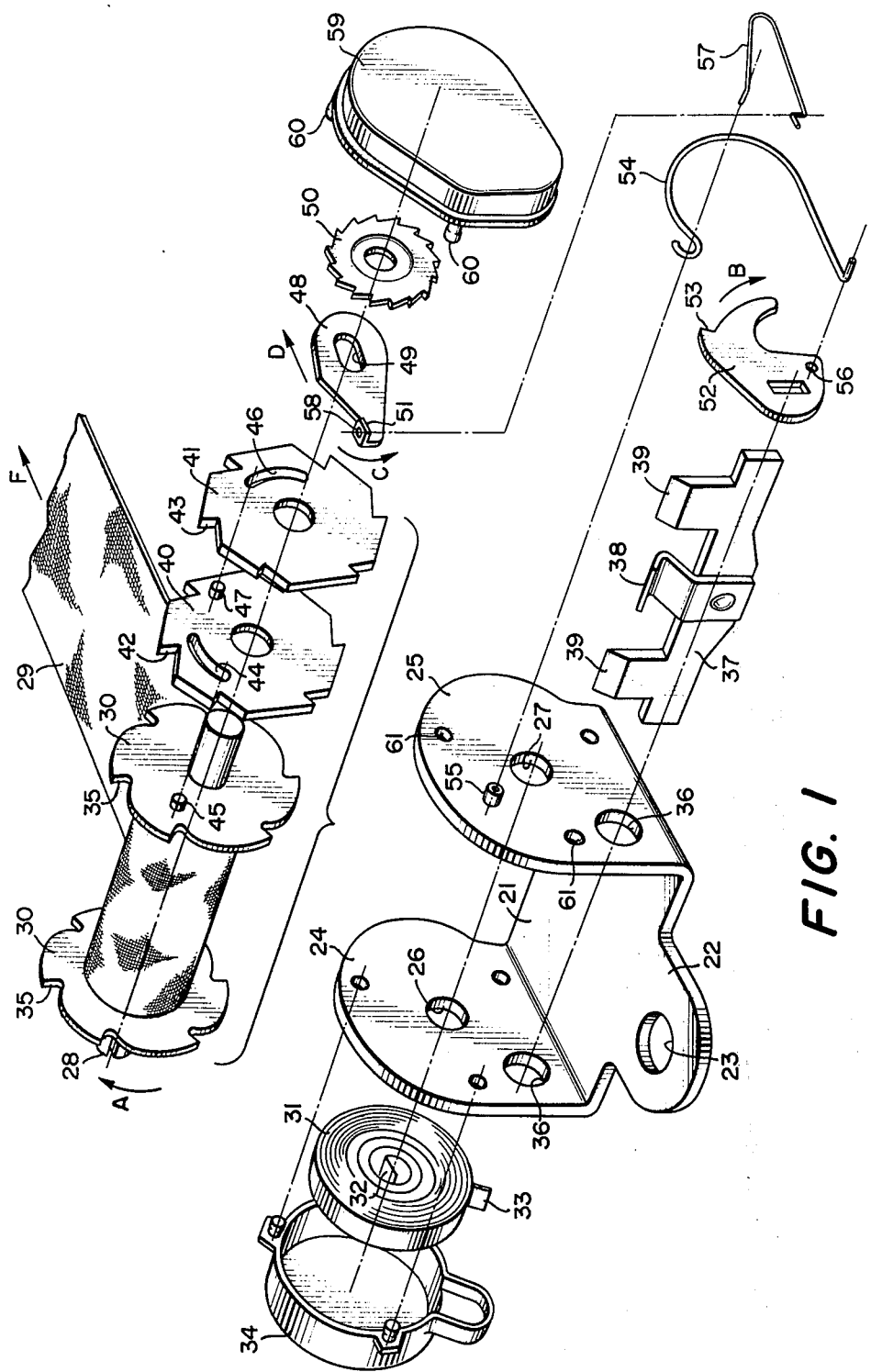
FIG. 1 is an exploded perspective view of the component parts of an embodiment of the strap retracting apparatus according to the present invention.
Figure 2:
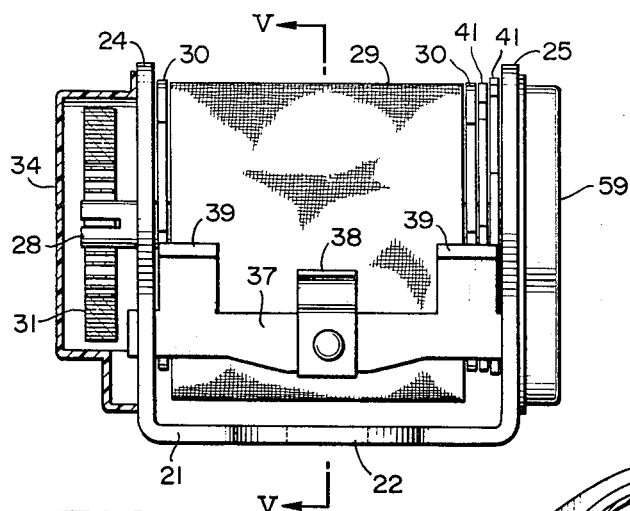
FIG. 2 is a front elevation showing the assembled state of the component parts shown in FIG. 1.

FIGS. 1, 2, 3, 4 and 5 show a first embodiment of the present invention.

Referring to FIGS. 1 to 5, a frame member 21 constitutes the base of a strap retracting apparatus, and an aperture 23 is bored in an extension or projection 22 of the frame member 21 so that the apparatus can be firmly bolted to a supporting member mounted to a seat, floor or any other suitable stationary part (not shown). The frame member 21 has a pair of side walls 24 and 25 formed integrally therewith, and a pair of aligned bearing apertures 26 and 27 are bored in the respective side walls 24 and 25. The side wall 25 serves also as a holding member for holding a lock preventing means described later. The shaft of a spool 28 is rotatably journaled at opposite ends in the bearing apertures 26 and 27, and a belt strap 29 is wound around the spool 28 with one end thereof fixed to the spool 28. A pair of locking wheels 30 are fixedly mounted on the opposite ends of the spool 28 and these locking wheels 30 serve as a guide for the belt strap 29. A retracting coil spring 31 is anchored at the inner end 32 thereof to one end of the shaft of the spool 28 which is mounted for rotation on the frame member 21. The spring 31 is anchored at the outer end 33 thereof to a spring cover 34 fixed to the side wall 24. The spool 28 is normally urged in a retracting direction as shown by the arrow A by the force of the coil spring 31. A plurality of substantially saw-tooth shaped locking teeth 35 are formed in equally circumferentially spaced relation on the outer peripheral edge of each locking wheel 30. In the illustrated example, 6 such teeth 35 are formed in 60° spaced apart relation. A locking plate 37 is swingably supported at opposite ends in a pair of aligned apertures 36 bored in the side walls 24 and 25, and a sensor 38 for sensing the outer diameter of the belt strap turns wound around the spool 28 is riveted to the locking plate 37. A pair of locking portions 39 for locking engagement with the locking teeth 35 of the respective locking wheels 30 are formed integrally with the locking plate 37.

A first lock preventing wheel 40 and a second lock preventing wheel 41 are rotatably mounted on the shaft of the spool 28 in coaxial relation with said locking wheel to constitute a lock preventing means. A plurality of auxiliary locking teeth 42 and 43 of shape substantially similar to that of the locking teeth 35 of the locking wheels 30 are formed in equally circumferentially spaced relation on the outer peripheral edge of the respective wheels 40 and 41. The outer diameter of the first lock preventing wheel 40 is slightly greater than that of the locking wheels 30, and the outer diameter of the second lock preventing wheel 41 is slightly greater than that of the first lock preventing wheel 40. These lock preventing wheels 40 and 41 themselves make lost motion relative to the spool 28. A projection 45 such as a pin fixed to one of the locking wheels 30 engages an arcuate recess 44 bored in the first lock preventing wheel 40, and a projection 47 such as a pin fixed to the first lock preventing wheel 40 engages an arcuate recess 46 bored in the second lock preventing wheel 41 so as to constitute a driving connection means between the wheels 30, 40 and 41. Thus, the lock preventing means is cooperated with the locking wheels 30 by the action of the driving connection means. The two lock preventing wheels 40 and 41 are disposed between the associated locking wheel 30 and the side wall 25.

A slot 49 of a first stopper 48 is loosely fitted on the end portion of the shaft of the spool 28 projecting from the bearing aperture 27 of the side wall 25, and a ratchet wheel 50 having a plurality of saw-tooth shaped teeth is also fixedly mounted on such end portion of the shaft of the spool 28. A pawl 51 formed on a portion of the first stopper 48 engages a latch portion 53 of a second stopper 52 fixed to the locking plate 37 as shown in detail in FIG. 4. A spring 54 engages at one end thereof with a pipe 55 fixed to the side wall 25 and at the other end thereof with an aperture 56 bored in the second stopper 52 so as to normally urge the second stopper 52 and the locking plate 37 in a direction as shown by the arrow B. A spring 57 engages at one end thereof with the pipe 55 and at the other end thereof with an aperture 58 bored in the pawl 51 so as to urge the first stopper 48 in a swinging direction as shown by the arrow C and in a linearly moving direction as shown by the arrow D. A cover 59 of plastic material is securely fixed to the side wall 25 with its projections 60 fitted in corresponding apertures 61 bored in the side wall 25.

Figure 5:
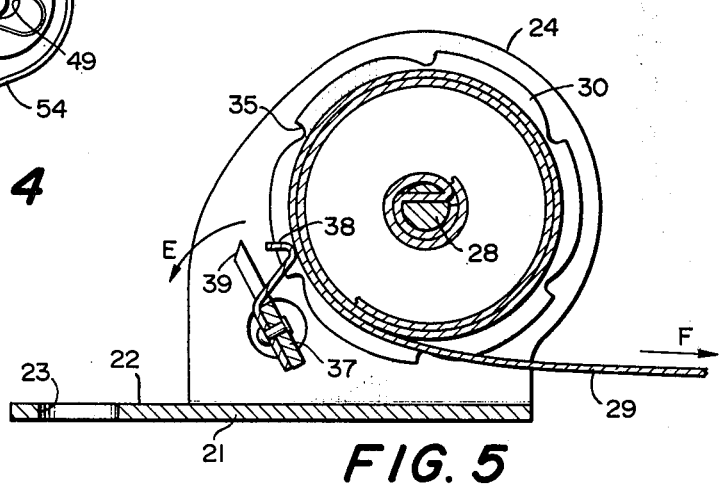
FIG. 5 is a section taken on the line V—V in FIG. 2 to show the belt strap in a retracted state.

FIG. 5 shows the state in which the belt strap 29 is taken up on the spool 28. It will be apparent from FIG. 5 that, in this state, the belt strap 29 is almost entirely taken up on the spool 28. Thus, the diameter of the belt strap turns wound around the spool 28 is maximum, and the coiled strap diameter sensor 38 is caused to swing in a direction as shown by the arrow E by being urged by the belt strap 29. As a result, the locking portions 39 of the locking plate 37 are disengaged from the locking teeth 35 of the locking wheels 30 so that the locking wheels 30 can rotate freely. The position of the locking plate 37 in which the locking portions 39 are disengaged from the locking teeth 35 of the locking wheels 30 is called herein an unlocking position. When a passenger pulls the belt strap 29 in a direction as shown by the arrow F, the diameter of the belt strap turns wound around the spool 28 is gradually reduced and the locking plate 37 swings in the direction of the arrow B. However, after a certain swinging movement of the locking plate 37 in the direction of the arrow B, the latch portion 53 of the second stopper 52 making swinging movement with the locking plate 37 is engaged by the pawl 51 of the first stopper 48 to limit further swinging movement of the locking plate 37. Therefore, even when the belt strap 29 is further extended, the locking portions 39 of the locking plate 37 would not engage the locking teeth 35 of the locking wheels 30 and the protraction of the belt strap 29 would not be obstructed.

Figure 3:
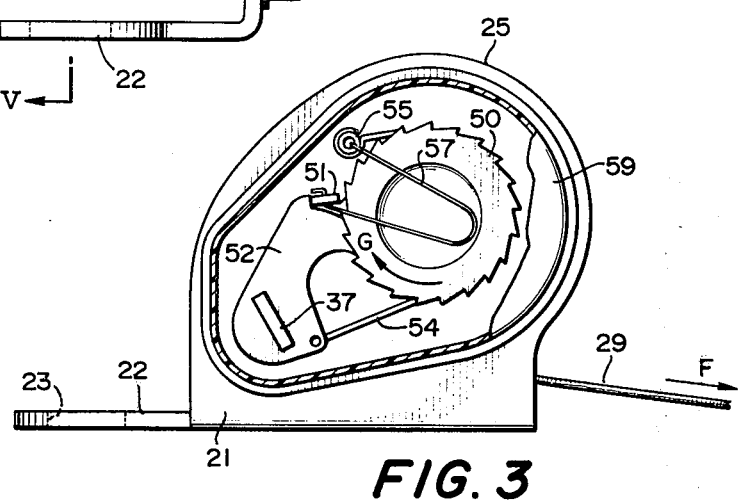
FIG. 3 is a side elevation when viewed from the right-hand side of FIG. 2, with a portion of the cover being cut away to show the detail of the locking mechanism.
Figure 4:
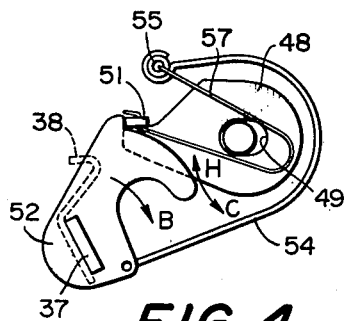
FIG. 4 is a front elevation of parts of the locking mechanism in the first embodiment.

When the passenger completes the engagement of the seat belt on his body, a small length of the belt strap 29 may be retracted onto the spool 28 due to the presence of a slight slack in the protracted belt strap 29. This rotation of the spool 28 causes rotation of the ratchet wheel 50 in a direction as shown by the arrow G in FIG. 3. As seen in FIGS. 3 and 4, the tooth of the wheel 50 rotating in the direction of the arrow G kicks up the pawl 51 of the first stopper 48 to cause swinging movement of the first stopper 48 in a direction as shown by the arrow H against the force of the spring 57. As a result, the latch portion 53 of the second stopper 52 is disengaged from the pawl 51 of the first stopper 48 so that the second stopper 52 is urged in the direction of the arrow B by the force of the spring 54 and the locking plate 37 swings also in the same direction. The locking portions 39 of the locking plate 37 engage the locking teeth 35 of the locking wheels 30 again. Thus, the belt strap 29 is locked at the length determined by the pitch of the locking teeth 35 and is prevented from further protraction. The position of the locking plate 37 in which the locking portions 39 thereof are in locking engagement with the locking teeth 35 of the locking wheels 30 is called herein a locking position. In this manner, any desired length of the belt strap 29 can be engaged on the body of the passenger, and the belt strap 29 is locked against movement in the protracting direction F, but it can move freely in the retracting direction. Prior art apparatus have had such a disadvantage that, when the belt strap 29 is retracted by the coil spring 31 to such an extent that the locking wheels 30 rotate by one step, that is, through an angle of 60°, the belt strap 29 tends to be re-locked in such a position.

The first embodiment of the present invention is constructed so that the belt strap 29 can be maintained in the initially set locked position even when the belt strap 29 engaging on the body of the passenger may move in the retracting direction within the range of about three steps.

The locking wheels 30 and the first lock preventing wheel 40 as well as the first and second lock preventing wheels 40 and 41 are arranged for cooperation by being operatively interconnected by the driving connection means composed of the projections 45, 47 and the recesses 44, 46, and each of these recesses 44 and 46 is shaped in the form of an arc of about 45°. Therefore, the locking wheels 30 and the first lock preventing wheel 40 as well as the first and second lock releasing wheels 40 and 41 can make relative movement within the angular range of 45°. The lock preventing means is employed to allow the rotation of said locking wheel 30 in the protract direction over some of pre-selected steps when the belt strap 29 is retracted some steps from the initially engaged position.

FIGS. 6 to 9 show schematically the relation among the locking wheels 30, lock preventing wheels 40, 41 and locking plate 37, and only one of the locking wheels 30 and the associated locking portion 39 of the locking plate 37 are shown therein for convenience of explanation.

Figure 6:
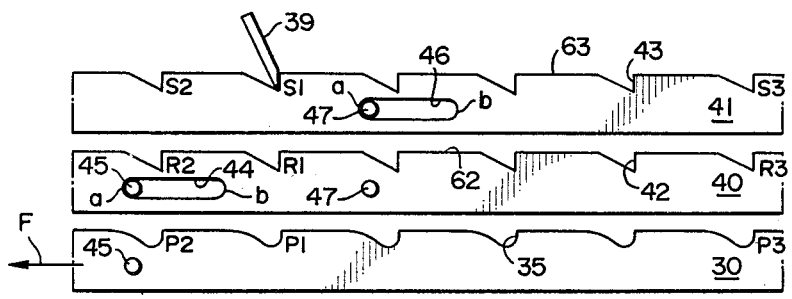
FIGS. 6, 7, 8 and 9 are schematic views showing the relation among the locking wheel, lock preventing wheels and locking plate to illustrate the operation of the first embodiment.
Figure 7:
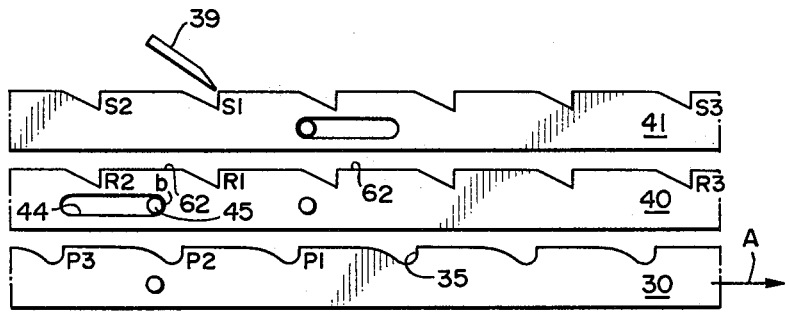
Figure 8:
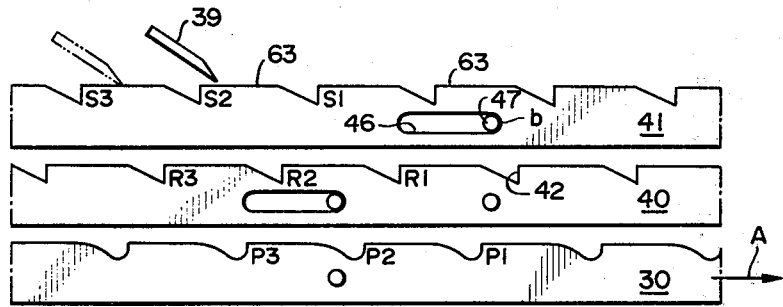
Figure 9:
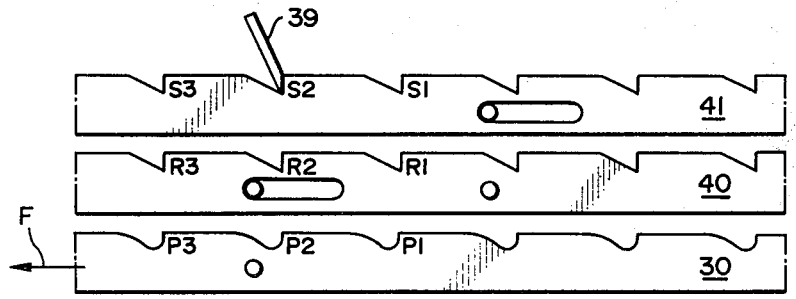

When the belt strap 29 is engaged on the body of the passenger with a suitable tension imparted thereto by the force of the coil spring 31, the locking portion 39 of the locking plate 37 engages with one of the locking teeth, for example, the locking tooth P1 of the locking wheel 30 and with one of the auxiliary locking teeth, for example, the auxiliary locking teeth R1 and S1 of the first and second lock preventing wheels 40 and 41 respectively as shown in FIG. 6, thereby locking the belt strap 29 against further protraction in the protracting direction. However, the locking wheel 30 can rotate freely in the strap retracting direction shown by the arrow A in FIG. 1. Thus, when a slack may occur in the tensioned belt strap 29 due to shaking movement of the passenger's body owing to vibrations of the vehicle, such slackened portion of the belt strap 29 is retracted to be wound around the spool 28 by the force of the coil spring 31. When the spool 28 and locking wheel 30 rotate through an angle of about 45°, the projection 45 of the locking wheel 30 bears against the end $b$ in the direction of retracting rotation of the recess 44 of the first lock preventing wheel 40 as shown in FIG. 7, and the first lock preventing wheel 40 starts to rotate with the locking wheel 30. In the state in which the first lock preventing wheel 40 rotates unitarily with the locking wheel 30, the locking teeth 35 of the locking wheel 30 are covered by the circumference 62 of the first lock preventing wheel 40. Thus, even when the next locking tooth P2 of the locking wheel 30 may be brought to a position opposite to the locking portion 39 of the locking plate 37 with the rotation of the locking wheel 30 through an angle of 60° as shown in FIG. 7, the locking portion 39 cannot engage the locking tooth P2 of the locking wheel 30. After rotation of the locking wheel 30 through an angle of about 90°, the projection 47 of the first lock preventing wheel 40 bears against the end $b$ in the direction of retracting rotation of the recess 46 of the second lock preventing wheel 41 with the result that the second lock preventing wheel 41 starts to rotate with the first lock preventing wheel 40. In this state, the auxiliary locking teeth 42 of the first lock preventing wheel 40 are covered by the circumference 63 of the second lock preventing wheel 41. Thus, even when the locking tooth P3 of the locking wheel 30 may be brought to a position opposite to the locking portion 39 of the locking plate 37 with the rotation of the locking wheel 30 through an angle of about 120° as shown in FIG. 8, the locking portion 39 cannot engage the locking tooth P3 of the locking wheel 30. It will thus be understood that, even when the belt strap 29 may be retracted due to the rotation of the locking wheel 30 over a range corresponding to more than two steps of locking teeth 35 thereof as shown in FIG. 8, the belt strap 29 is protracted again in response to the restoration of the tension for fastening the passenger to the seat so that the belt strap 29 can be locked in the initially set position shown in FIG. 6 and there is utterly no change in the length of the protracted portion of the belt strap 29. In this embodiment, said range is preselected by the number of the lock preventing wheels and so on.

The belt strap 29 may be retracted in the direction of the arrow A until the auxiliary locking tooth S2 of the second lock preventing wheel 41 which is driven by the locking wheel 30 through the first lock preventing wheel 40 moves relative to the locking portion 39 of the locking plate 37 so that the locking portion 39 may take a position as shown by the chain lines in FIG. 8. Then, when the belt strap 29 is protracted, the locking portion 39 of the locking plate 37 engages with the locking tooth P2 of the locking wheel 30 and with the auxiliary locking teeth R2 and S2 of the first and second lock preventing wheels 40 and 41 respectively, with the result that the length of the protracted portion of the belt strap 29 is reduced by an amount corresponding to one step of the locking teeth 35 of the locking wheel 30.

The number of the lock preventing wheels may be modified as desired. Further, the angular range in which the lock preventing wheels can make relative movement (or more precisely, the length of the recesses) can be suitably selected to lie within the range of the angle corresponding to one step of the locking teeth 35 of the locking wheel 30.

Figure 10:
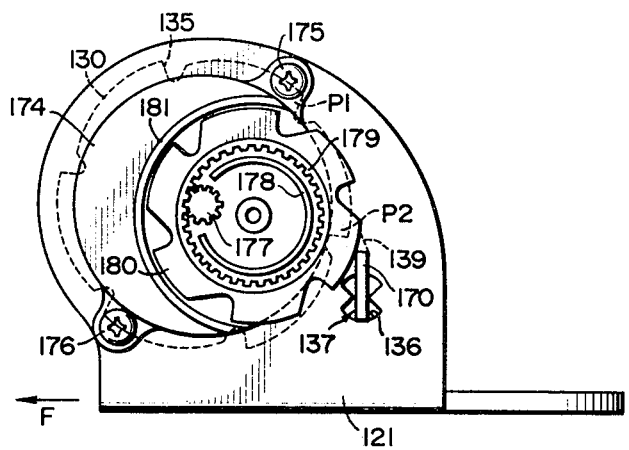
FIG. 10 is a side elevation of a second embodiment of the present invention.
Figure 11:
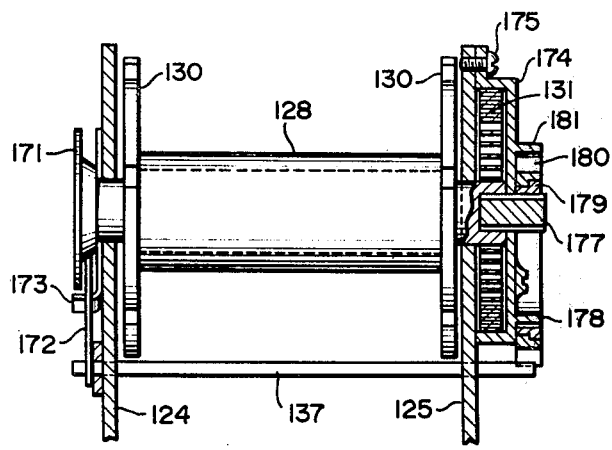
FIG. 11 is a front elevation of FIG. 10, with parts cut away to show the detail of the lock preventing mechanism.
Figure 12:
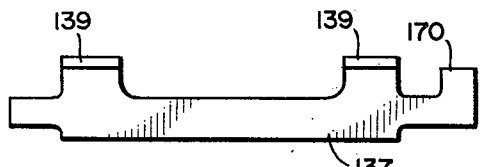
FIG. 12 is a front elevation of the locking plate employed in the second embodiment.

FIGS. 10 to 12 show a second embodiment of the present invention. Referring to FIGS. 10 to 12, a frame member 121 has a pair of side walls 124 and 125, and the shaft of a spool 128 having a pair of locking wheels 130 fixedly mounted thereon is journalled at opposite ends in these side walls 124 and 125. A known belt strap (not shown) is wound around this spool 128. A locking plate 137 is swingably supported at opposite ends in a pair of aligned butterfly-shaped slots 136 bored in the side walls 124 and 125 of the frame member 121. As shown in detail in FIG. 12, the locking plate 137 is provided with a pair of locking portions 139 and an auxiliary locking portion 170. These locking portions 139 are engageable with 6 locking teeth 135 formed on the outer peripheral edge of the respective locking wheels 130, and the auxiliary locking portion 170 is engageable with 6 auxiliary locking teeth formed on the outer peripheral edge of a lock preventing wheel described in detail later. A ratchet wheel 171 is fixedly mounted on one end of the shaft of the spool 128, and an arm 172 is fixed to one end of the locking plate 137. The ratchet wheel 171, the arm 172 and a lever 173 constitute parts of a known automatic locking mechanism for locking the belt strap when the belt strap is engaged on the body of a passenger, but any detailed description will not be given herein as such a mechanism is commonly known.

A holding member 174 is firmly fixed to the frame member 121 by screws 175 and 176, and a retracting coil spring 131 is housed within this holding member 174. The retracting coil spring 131, which is also commonly known, is anchored at opposite ends thereof to the shaft of the spool 128 and to the holding member 174 respectively for normally urging the spool 128 in a retracting direction. A pinion 177 is fixedly mounted on the end of the shaft of the spool 128 and protrudes from the holding member 174 as shown in FIG. 11. This pinion 177 is in meshing engagement with an internal gear 179 supported rotatably by a supporting portion 178 which is an extension of the holding member 174. A lock preventing wheel 180 serving as a lock preventing means is also formed with 6 auxiliary locking teeth and has a central opening which makes slipping engagement with the outer periphery of the internal gear 179 so that the lock preventing wheel 180 can slip relative to the internal gear 179. The lock preventing wheel 180 is supported rotatably at the outer periphery thereof by a supporting portion 181 which is also an extension of the holding member 174. The auxiliary locking portion 170 of the locking plate 137 is engageable with the auxiliary locking teeth of the lock preventing wheel 180. However, due to the fact that the locking wheels 130 and lock preventing wheel 180 are not coaxial and the portion of the outer periphery of the lock preventing wheel 180 projects beyond the corresponding portion of the locking wheels 130 as shown in detail in FIG. 10, the locking portions 139 of the locking plate 137 cannot engage the locking teeth 135 of the locking wheels 130 when the auxiliary locking portion 170 of the locking plate 137 is in engagement with the outer peripheral portion of the lock preventing wheel 180. Further, in this second embodiment, the locking wheels 130 and lock preventing wheel 180 each having 6 locking teeth are so sized that three steps of the locking wheels 130 correspond substantially to one step of the lock preventing wheel 180 so as to provide a reduction ratio of 3:1. Although not shown, suitable covers are provided to cover the outer periphery of the locking wheels 130 and the end face of the lock preventing wheel 180.

The second embodiment having such a structure operates in a manner as described below. When the belt strap is protracted in a direction as shown by the arrow F to be engaged on the body of a passenger, the locking wheels 130 and lock preventing wheel 180 rotate clockwise in FIG. 10, while at this time, the locking plate 137 is caused to swing clockwise in FIG. 10 by the known locking mechanism and held in an unlocking position. Upon completion of the engagement of the belt strap on the body of the passenger, the locking plate 137 swings counterclockwise in the manner commonly known in the art and the belt strap is slightly retracted by the force of the retracting coil spring 131. As a result, the auxiliary locking portion 170 of the locking plate 137 engages one of the auxiliary locking teeth of the lock preventing wheel 180, and then the locking portions 139 of the locking plate 137 engage one of the locking teeth of the locking wheels 130 to complete the locking operation with the lock preventing wheel 180 making slipping engagement with the internal gear 179.

Then, when the passenger moves his body in the locked state, the slackened portion of the belt strap is retracted and the locking wheels 130 rotate counterclockwise. FIG. 10 shows the situation in which the locking tooth P1 of each locking wheel 130 having been engaged by the corresponding locking portion 139 is shifted by one pitch and the next locking tooth P2 is brought to a position opposite to the locking portion 139. In the prior art apparatus of this kind, the locking tooth P2 has been engaged by the locking portion 139 of the locking plate 137 to fasten the passenger to the seat in a tighter state. In the second embodiment of the present invention, however, the lock preventing wheel 180 is arranged to rotate counterclockwise at a reduced speed with the counterclockwise rotation of the locking wheels 30 as apparent from FIG. 10, so that the auxiliary locking portion 170 of the locking plate 137 engages the outer peripheral portion of the lock preventing wheel 180 to prevent locking engagement between the locking portions 139 and the locking wheels 130. Of course, the slip between the lock preventing wheel 180 and the internal gear 179 is selected to be greater than the friction between the auxiliary locking portion 170 and the lock preventing wheel 180. Thus, in the second embodiment of the present invention, even when the passenger may move his body by an amount corresponding to about three steps of the locking wheels 130 or actually in an amount of the order of 50 to 70 mm, the belt strap can be necessarily locked in the initially engaged position and the movement of the passenger's body is not unduly restricted. Due to the fact that the lock preventing wheel 180 is arranged to slip relative to the internal gear 179, the belt strap length engaged on the passenger's body can be adjusted over a plurality of steps determined by the step of the locking wheels 130, and thus, the protracted belt strap length can be very finely adjusted. The lock preventing wheel 180 may be arranged to slip relative to any other suitable portion between it and the spool 128, for example, the portion in which the pinion 177 is fitted.

Figure 13:
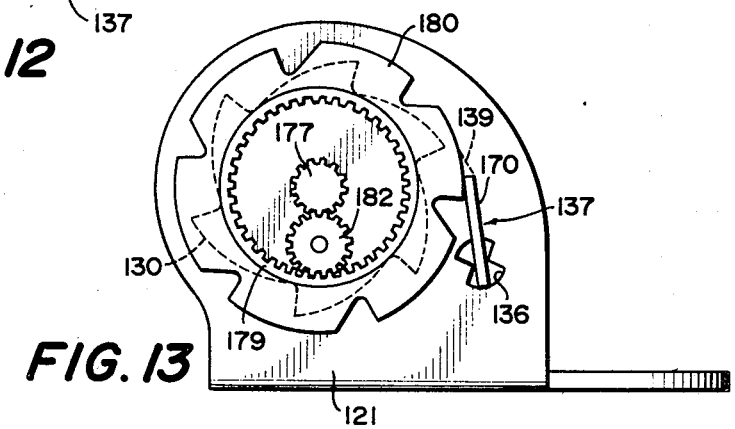
FIG. 13 is a side elevation of a third embodiment of the present invention.

FIG. 13 shows a third embodiment of the present invention which is actually a partial modification of the second embodiment. Referring to FIG. 13, the lock preventing wheel 180 is disposed in coaxial relation with the locking wheels 130, and an intermediate gear 182 is disposed between the pinion 177 and the internal gear 179. The third embodiment operates in entirely the same manner as the second embodiment.

Figure 14:
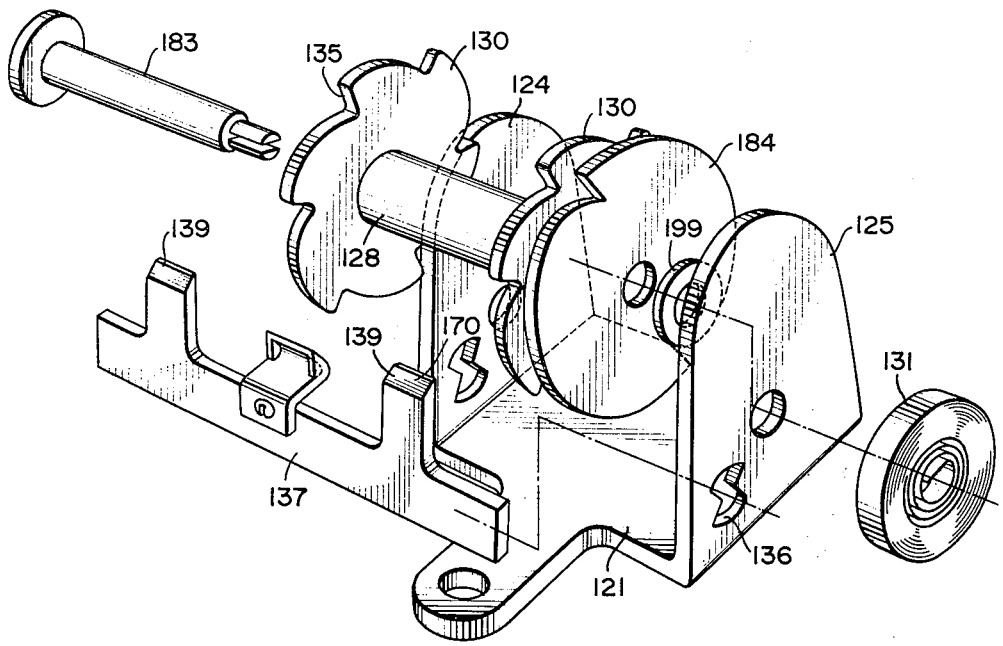
FIG. 14 is an exploded perspective view of parts of a fourth embodiment of the present invention.

FIG. 14 shows a fourth embodiment of the present invention which is also a modification of the second and third embodiments. The fourth embodiment differs from the second and third embodiments in that the lock preventing wheel 184 is in slipping engagement with the shaft 183 of the spool 128. The lock preventing wheel 184 is disposed between the side wall 125 and one of the locking wheels 130 and is frictionally coupled by a spring washer 199 to one of the locking wheels 130 on the shaft 183 supporting the spool 128 so that it can make interlocking operation with the locking wheels 130. No reduction mechanism is provided in this embodiment unlike the second and third embodiments, and the number of the auxiliary locking teeth of the lock preventing wheel 184 is selected to be two which is ⅓ of the 6 locking teeth of the locking wheels 130 so as to obtain the effect similar to that of the reduction mechanism.

Figure 15:
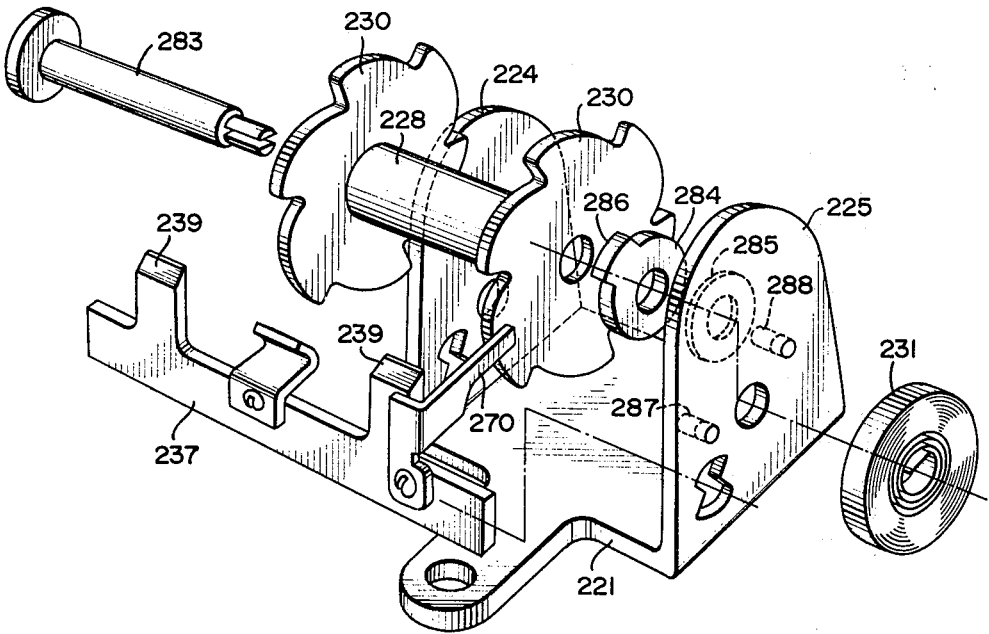
FIG. 15 is an exploded perspective view of parts of a fifth embodiment of the present invention.
Figure 16:
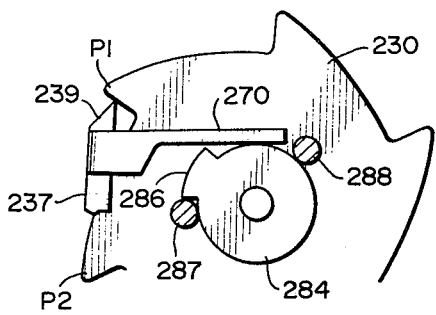
FIGS. 16 and 17 are views showing the operation of the fifth embodiment in a non-preventing position and preventing position respectively.
Figure 17:
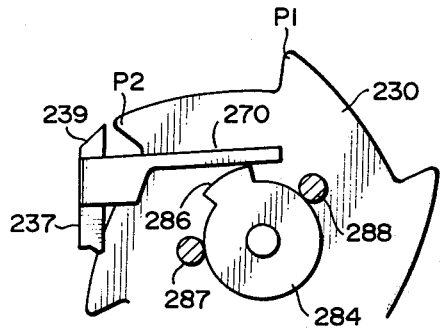
Figure 18:
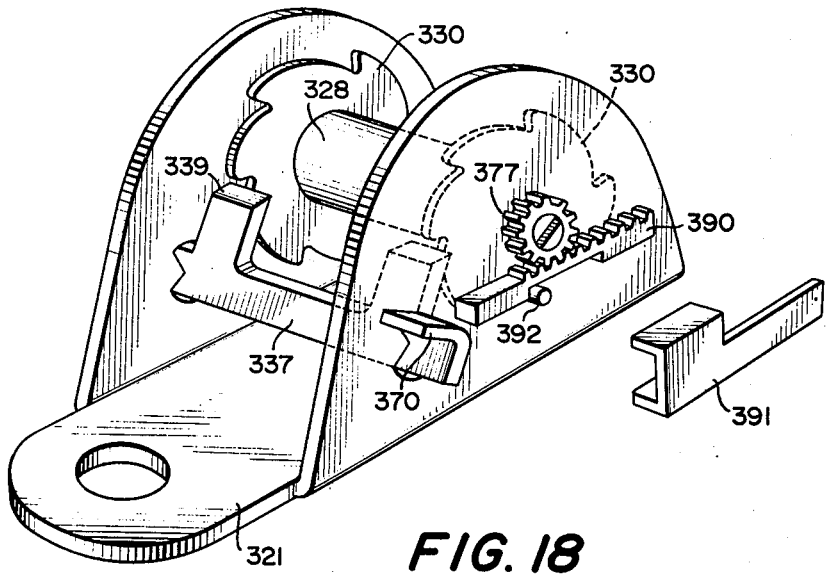
FIG. 18 is a perspective view of a sixth embodiment of the present invention.

A fifth embodiment of the present invention will be described with reference to FIGS. 15 to 17. Referring to FIGS. 15 to 17, a frame member 221 has a pair of side walls 224 and 225, and a spool 228 having a pair of locking wheels 230 fixedly mounted thereon is rotatably supported between the side walls 224 and 225 by a shaft 283 which extends through the spool 228. The shaft 283 rotates in unitary relation with the spool 228, and a cam member 284 serving as a lock preventing means is loosely mounted on one end portion of the shaft 283. The shaft 283 extends further through a spring washer 285 imparting driving force to the cam member 284 and is fixed at the end thereof to a retracting coil spring 231. The cam member 284 is provided with a cam 286 projecting from an outer peripheral portion thereof, and its rotating movement is limited by a pair of spaced pins 287 and 288 fixed to the side wall 225 of the frame member 221 so that it is movable between a preventing position and a non-preventing position. A locking plate 237 has a pair of locking portions 239 similar to those in the second embodiment, and a separately prepared auxiliary locking portion 270 is fixed to the locking plate 237.

The operation of the fifth embodiment having such a structure will be described with reference to FIGS. 16 and 17. When a belt strap (not shown) is protracted, the locking wheels 230 and cam member 284 rotate in a counterclockwise direction, but the counterclockwise rotation of the cam member 284 is limited by the pin 287 and the cam member 284 is held in the non-preventing position shown in FIG. 16 due to the fact that it is loosely mounted on the shaft 283. When a passenger wears the belt strap on his body, the locking plate 237 makes swinging movement in the manner commonly known in the art. Since the cam member 284 is held in the position shown in FIG. 16, the auxiliary locking portion 270 of the locking plate 237 does not engage the cam 286 and each of the locking portions 239 engages the locking tooth P1 of the associated locking wheel 230 to complete locking of the belt strap. When the passenger moves his body in such a state and the locking wheels 230 rotate clockwise, the next locking tooth P2 of each locking wheel 230 is brought to a position opposite to the locking portion 239 as shown in FIG. 17. However, the cam member 284 is also rotated clockwise at the same time to take the preventing position shown in FIG. 17 thereby urging the auxiliary locking position 270 of the locking plate 237 upward. Therefore, each of the locking portions 239 does not engage the locking tooth P2 of the associated locking wheel 230. Due to the fact that further clockwise rotation of the cam member 284 is restricted by the pin 288, the cam member 284 makes slipping movement relative to the shaft 283 even when the locking wheels 230 rotate over more than about three steps. It is apparent that, in the fifth embodiment too, impartation of an excessive fastening pressure to the passenger can be prevented when he may move his body in the usual manner.

A sixth embodiment of the present invention will be described with reference to FIGS. 18 to 21. Referring to FIGS. 18 to 21, a pinion 377 is mounted on the shaft of a spool 328 in such a manner that it makes slipping movement relative to the spool 328 when a torque greater than a predetermined setting is imparted to the spool 328. This pinion 377 is in meshing engagement with a rack 390 serving as a lock preventing means. The rack 390 is arranged for linear movement by being guided by a guide 391 fixed to a frame member 321 and the linear movement of the rack 390 is limited by a pin 392 fixed to the frame member 321, to engage a recess formed on the rack 390.

Figure 19:
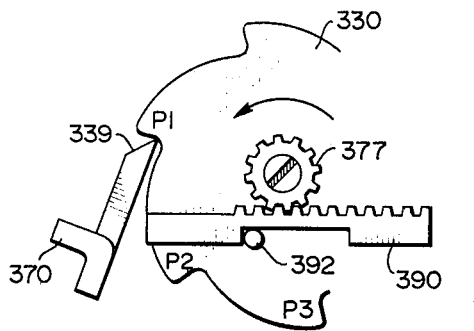
FIGS. 19, 20 and 21 are views illustrating the operation of the sixth embodiment.
Figure 20:
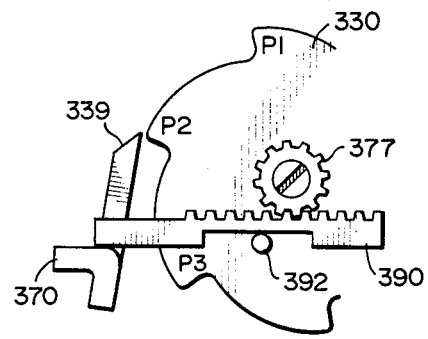
Figure 21:
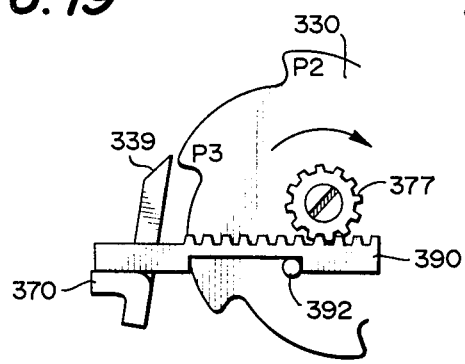
Figure 22:
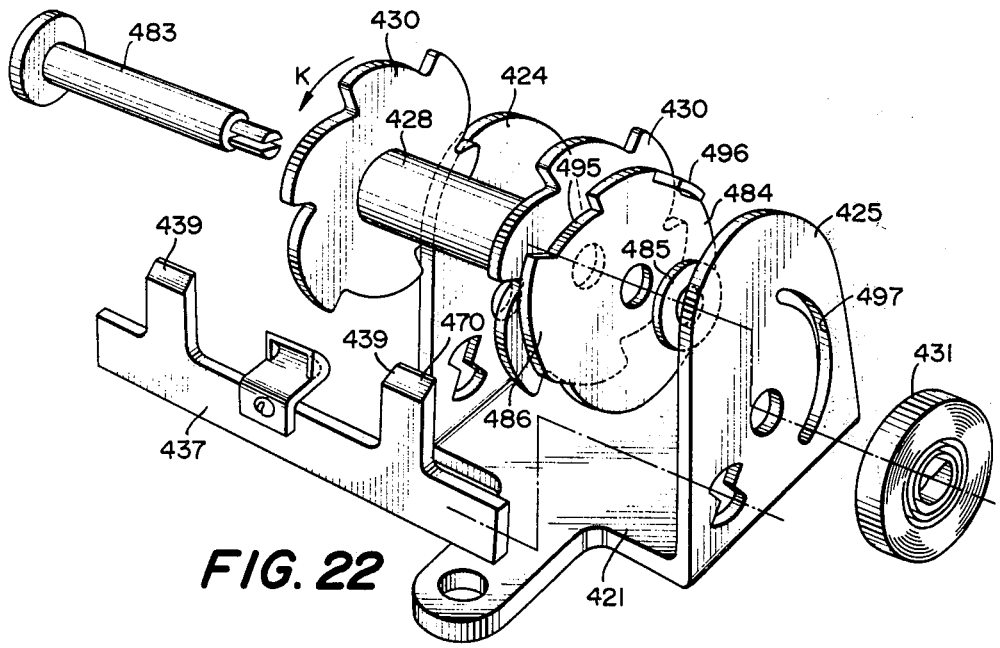
FIG. 22 is an exploded perspective view of a seventh embodiment of the present invention.

The operation of the sixth embodiment having such a structure will be described with reference to FIGS. 19 to 21. When a belt strap (not shown) is protracted, locking wheels 330 and pinion 377 rotate counterclockwise and the rack 390 moves to the right. The linear movement of the rack 390 to the right is restricted by the pin 392 due to engagement of the pin 392 with the left-hand end of the recess of the rack 390. The pinion 377 makes slipping movement relative to the spool 328, and when the engagement of the belt strap on the passenger's body is completed, each of locking portions 339 of a locking plate 337 engages the locking tooth P1 of the associated locking wheel 330 as shown in FIG. 19 to lock the belt strap. This position of the rack 390 is the non-preventing position. When the passenger wearing the belt strap on his body moves his body, the locking wheels 330 rotate clockwise as shown in FIGS. 20 and 21, and the rack 390 is urged toward the left by the pinion 377 to engage an auxiliary locking portion 370 of the locking plate 337 thereby causing swinging movement of the locking plate 337. This position of the rack 390 is the preventing position. As a result, the locking portions 339 are urged away from the engageable range with the locking wheels 330, and no locking action is carried out even when the locking tooth P2 in FIG. 21 and the locking tooth P3 in FIG. 22 is brought to a position opposite to the corresponding locking portion 339 of the locking plate 337. As seen in FIG. 21, the rack 390 is restricted from further movement after it has moved the predetermined distance, and the pinion 377 makes slipping movement relative to the spool 328 again. It will therefore be understood that this embodiment can also provide a great margin for the movement of the body of the passenger.

FIG. 22 shows a seventh embodiment of the present invention which is generally similar to the fifth embodiment shown in FIGS. 15 to 17. Referring to FIG. 22, a spool 428 having a pair of locking wheels 430 fixedly mounted thereon is supported on a shaft 483 which is journalled in opposite side walls 424 and 425 of a frame member 421. A lock preventing member in the form of a cam member 484 is loosely mounted on the shaft 483, and this cam member 484 is frictionally coupled to one of the locking wheels 430 by a spring washer 485 disposed between the cam member 484 and the side wall 425 which serves as a holding member. The shaft 483 extends through the spool 428 so as to rotate in unitary relation with the locking wheels 430, and a retracting coil spring 431 is fixed at the inner end thereof to one end of the shaft 483. A projection 496 is formed as an integral part of the cam member 484 to engage an arcuate slot 497 bored in the side wall 425. This slot 497 serves as a means for restricting the position of the lock preventing cam member 484. A locking plate 437 having a pair of locking portions 439 is swingably supported at opposite ends in apertures bored in the side walls 424 and 425 of the frame member 421. A part of one of the locking portions 439 serves as an auxiliary locking portion 470 which holds the locking plate 437 in an unlocking position when it engages a cam surface 486 formed on the outer peripheral edge of the lock preventing cam member 484.

In response to protraction of a belt strap (not shown), the locking wheels 430 rotate in a direction as shown by the arrow K in FIG. 22, and the cam member 484 rotates also in the same direction. The cam member 484 rotating in this direction is restricted from further rotation since the projection 496 bears finally against one end of the slot 497 bored in the side wall 425 of the frame member 421. The cam member 484 is provided with a recess 495 as shown so that the locking member 437 can be held in a locking position when the auxiliary locking portion 470 engages this recess 495. In response to retraction of the belt strap from the position engaging on the body of a passenger, the locking plate 437 can be held in the unlocking position due to the fact that the cam surface 486 is engaged by the auxiliary locking portion 470.

What is claimed is:

1. A seat belt retracting apparatus comprising: a frame member; a spool mounted for rotation on said frame member and adapted to have a seat belt wound thereon; a retracting spring anchored at one end thereof to said spool for normally urging said spool in one direction of rotation to retract said seat belt on said spool; at least one locking wheel fixedly mounted on said spool and having a plurality of locking teeth on the outer periphery thereof; a locking plate having at least one locking portion engageable with one of said locking teeth when said seat belt is protracted and engages the body of a passenger thereby locking said seat belt against further protraction, said locking plate being supported on said frame member so as to be movable between a locking position and an unlocking position; lock preventing means arranged for cooperation with said locking plate for temporarily unlocking said locking wheel to allow the rotation of said locking wheel in protracting direction over a predetermined number of said locking teeth after said engaged seat belt is retracted said predetermined number of locking teeth from the engaged position driving connection means between said locking wheel and said lock preventing means for drivably connecting said lock preventing means in interlocking relation with said locking wheel; and holding means for holding said lock preventing means on said retracting apparatus.

2. A seat belt retracting apparatus as claimed in claim 1, wherein said lock preventing means is mounted rotatably on said spool and adjacent to said locking wheel.

3. A seat belt retracting apparatus as claimed in claim 1, wherein said driving connection means includes interconnecting members for connecting said lock preventing means to said locking wheel so that said lock preventing means is movable relative to said locking wheel within a predetermined angular range.

4. A seat belt retracting apparatus as claimed in claim 3, wherein said interconnecting members include a projection provided on one of said locking wheel and said lock preventing means and a recess provided on the other for engagement with said projection.

5. A seat belt retracting apparatus as claimed in claim 2, wherein said lock preventing means includes a plurality of lock preventing wheels, and said driving connection means includes a set of interconnecting members for connecting said locking wheel to one of said lock preventing wheels so that said lock preventing wheel is movable relative to said locking wheel within a predetermined angular range and another set of interconnecting members for connecting said lock preventing wheels to each other so that said lock preventing wheels are movable relative to each other within a predetermined angular range.

* * * * *